No. 11,855. Reissued Sept. 18, 1900.

S. W. WARDWELL, Jr.

APPARATUS FOR WINDING COPS OR BALLS.

5 Sheets—Sheet 1.

Witnesses
J. G. Hinkel
J. J. McCarthy

Inventor
Simon W. Wardwell Jr.
by Inter Freeman
Attorneys

No. 11,855. Reissued Sept. 18, 1900.

S. W. WARDWELL, JR.

APPARATUS FOR WINDING COPS OR BALLS.

5 Sheets—Sheet 2.

Witnesses
J. G. Hinkel
J. J. McCarty

Inventor
Simon W. Wardwell Jr.
by Foster & Freeman
Attorneys

No. 11,855. Reissued Sept. 18, 1900.

S. W. WARDWELL, JR.

APPARATUS FOR WINDING COPS OR BALLS.

5 Sheets—Sheet 3.

Witnesses
J. G. Hinkel
J. J. M. Carthy

Inventor
Simon W. Wardwell Jr.
by Inter & Freeman
Attorneys

No. 11,855. Reissued Sept. 18, 1900.

S. W. WARDWELL, Jr.

APPARATUS FOR WINDING COPS OR BALLS.

5 Sheets—Sheet 4.

Witnesses
J. J. Stinkel
J. J. McCarthy

Inventor
Simon W. Wardwell Jr.
By Foster Freeman
Attorneys

No. 11,855. Reissued Sept. 18, 1900.

S. W. WARDWELL, JR.

APPARATUS FOR WINDING COPS OR BALLS.

(Application filed July 14, 1899.)

5 Sheets—Sheet 5.

Witnesses
F. L. Mockabee
J. J. McCarthy.

Inventor
Simon W. Wardwell Jr.
by Arthur Freeman
Attorneys

UNITED STATES PATENT OFFICE.

SIMON W. WARDWELL, JR., OF PROVIDENCE, RHODE ISLAND, ASSIGNOR, BY MESNE ASSIGNMENTS, TO THE UNIVERSAL WINDING COMPANY, OF PORTLAND, MAINE.

APPARATUS FOR WINDING COPS OR BALLS.

SPECIFICATION forming part of Reissued Letters Patent No. 11,855, dated September 18, 1900.

Original No. 480,157, dated August 2, 1892. Application for reissue filed July 14, 1899. Serial No. 723,847.

*To all whom it may concern:*

Be it known that I, SIMON W. WARDWELL, Jr., a citizen of the United States, formerly residing at Boston, Suffolk county, and State of Massachusetts, but now residing in Providence, county of Providence, and State of Rhode Island, have invented certain new and useful Improvements in Apparatus for Winding Cops or Balls, of which the following is a specification.

My invention has for its object to produce cops of absolutely-uniform character throughout and of any required length without alteration of their characteristics hereinafter set forth; and to this end my invention consists in certain mechanism devised for systematically winding such cops, as fully set forth hereinafter and illustrated in the accompanying drawings, in which—

Figure 1:
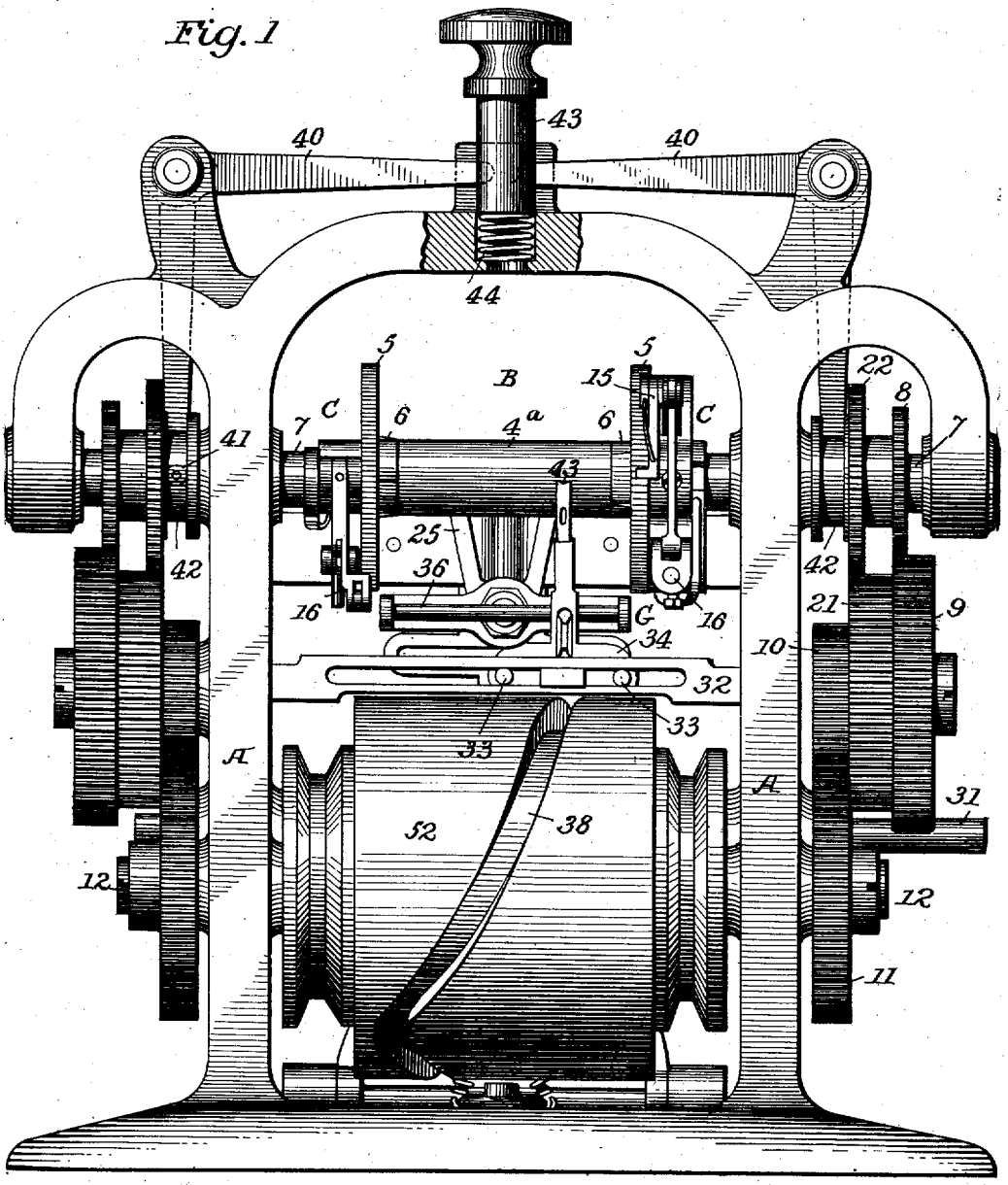
Figure 2:
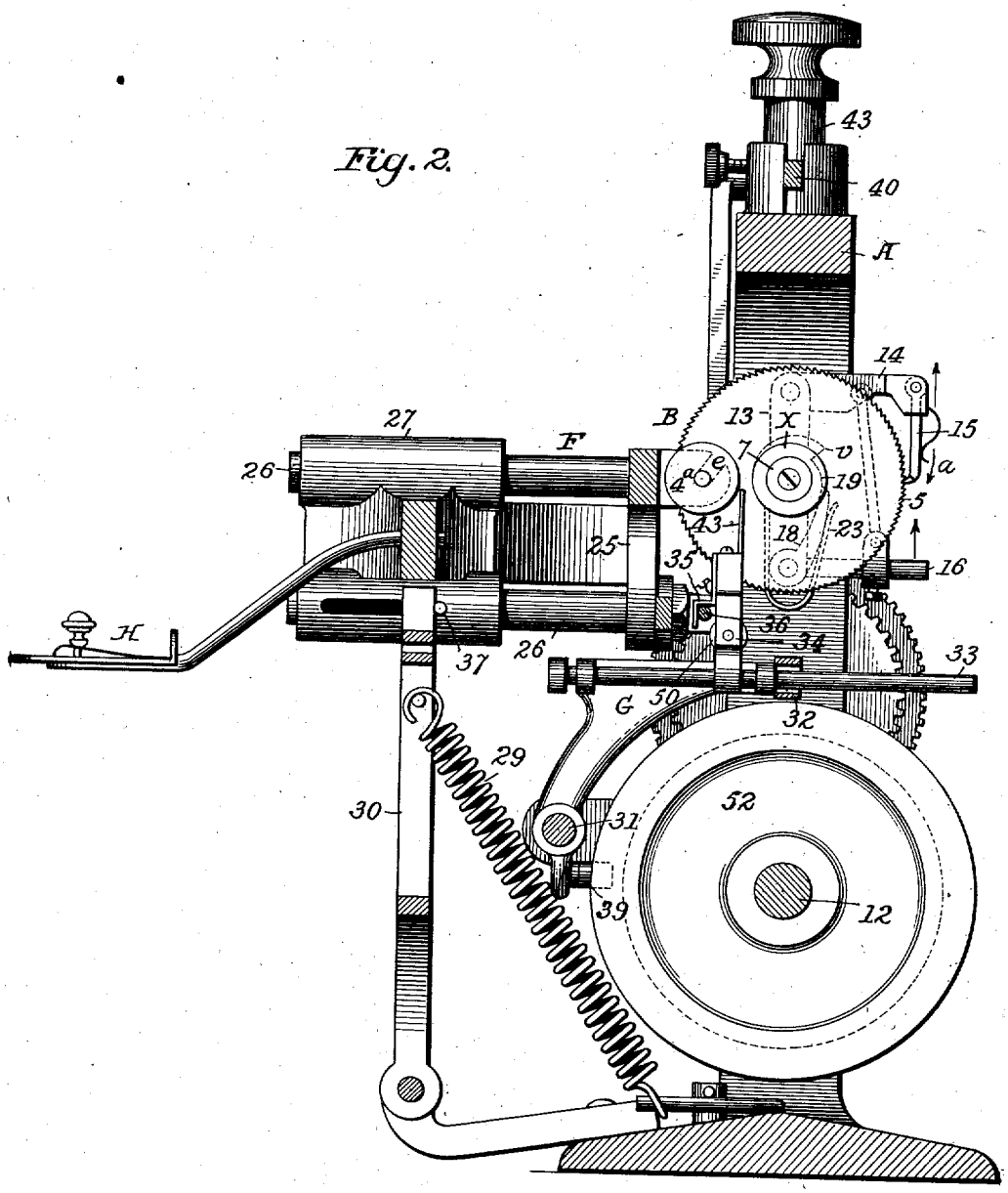
Figure 3:
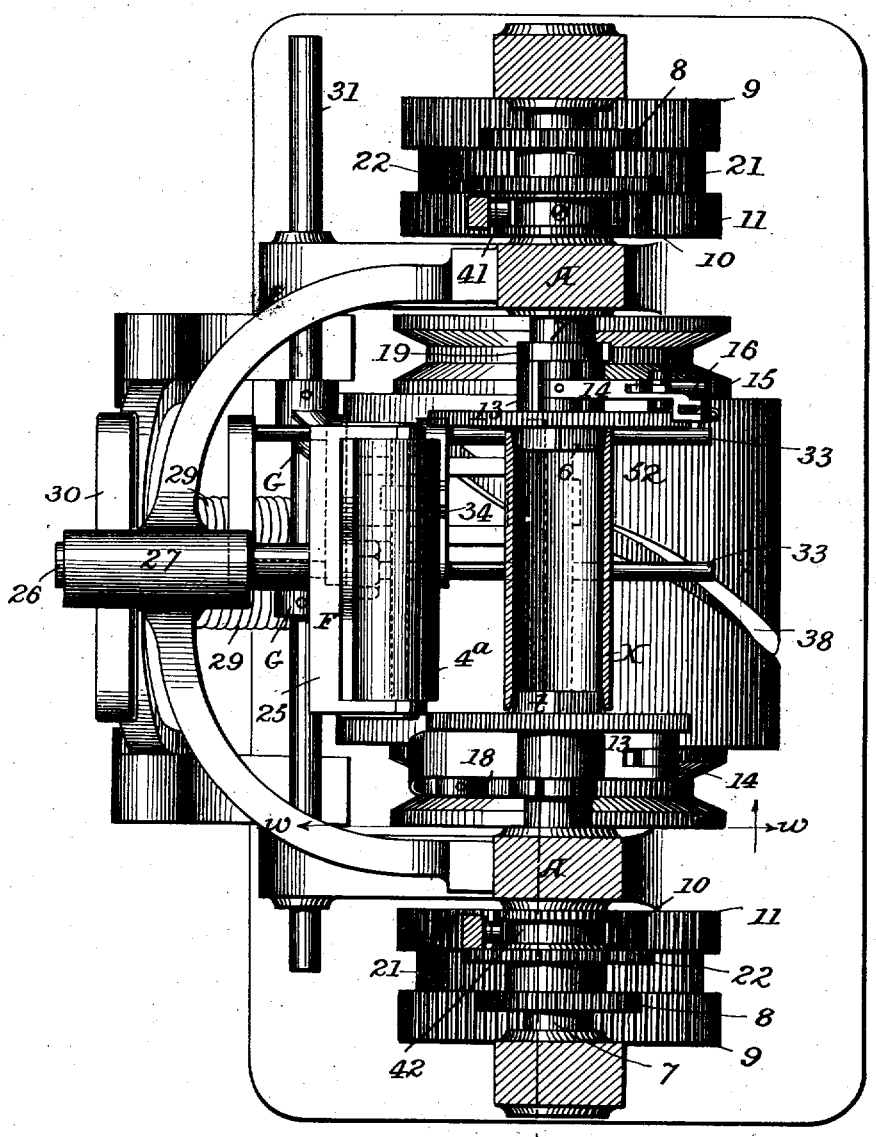
Figure 4:
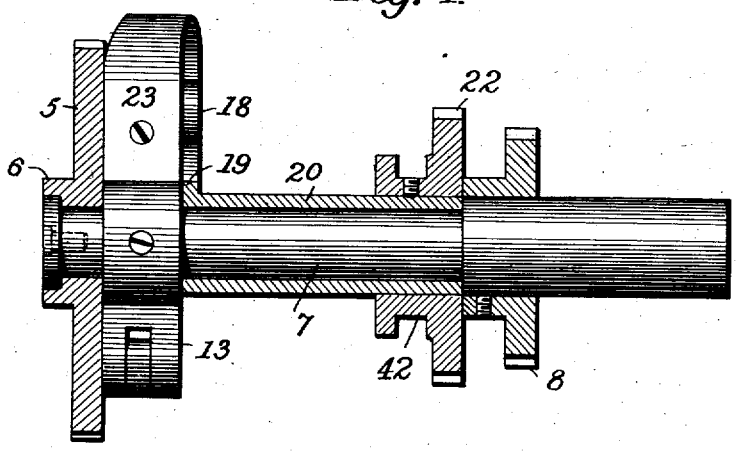
Figure 5:
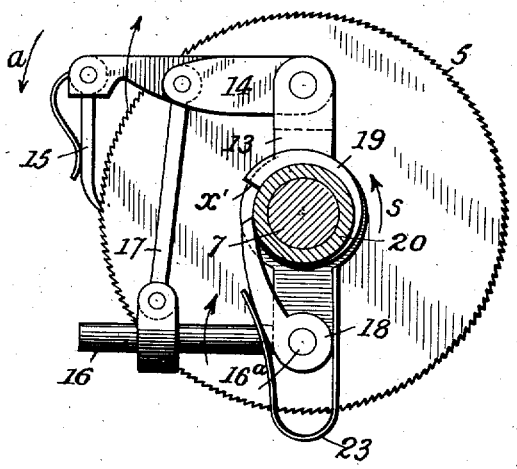
Figure 6:
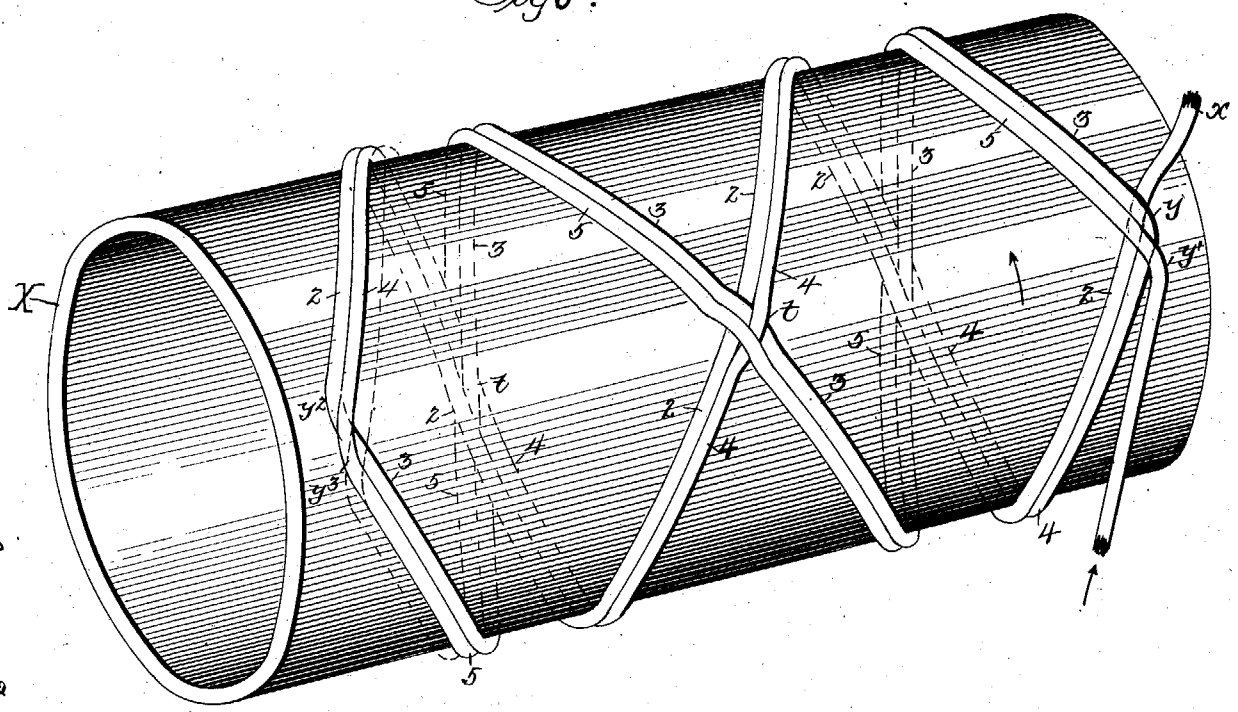

Figure 1 is an elevation in part section of a machine embodying my improvements. Fig. 2 is a transverse sectional elevation. Fig. 3 is a sectional plan on an enlarged scale. Fig. 4 is a section on the line *t t*, Fig. 3. Fig. 5 is a section on the line *w*, Fig. 3, looking in the direction of the arrow; Fig. 6, a perspective view illustrating the mode of laying the thread in producing the first layer and in subsequent layers of one of my improved cops.

In the methods most commonly heretofore used in winding balls or cops of yarn, thread, cord, or rope the apparatus employed is of such character and so operated that the thread is conducted to a revolving cylinder or tube and carried transversely first to one end and then to the other of the latter, laying it sometimes in inclined rings and sometimes in irregular coils, but without insuring any regular or uniform or systematic placing of the thread, the irregularity being increased in most instances by the arrangement of the guide-eye distant from the cop, which permits a play of the thread between the guide and cop. In such modes of building up a cop the thread if laid in rings (as results from a half-revolution of the cylinder to each traverse of the thread-guide in one direction) cannot be relied upon to retain the position in which it is deposited on the cylinder owing to the slippage of the rings inward from each end and piling together in the center, thus forming a central rounded rib much narrower than the completed cop, and this rib will gradually expand as successive rings are laid until finally the cylinder is covered the length of the cop, forming a core in which the thread is irregularly disposed thicker at the center than at the ends, and the cop is completed either in a ball form or attains a cylindrical shape only after a large portion of the same has been wound. In those machines of old forms in which the cylinder makes one or more rotations to each traverse of the guide parts are so constructed and timed that the number of turns of thread in each coil gradually decreases as the size of the cop increases, so that while there may be six or eight turns in each coil of the thread lying directly upon the tube in the first layer there will be but one or two turns in each coil of thread extending from one edge to the other of the cop in the last external layer, and the winding is consequently irregular, and the threads are not and cannot be laid parallel in the successive coils. The cop is soft and yielding and readily crushed and broken. In other cases the apparatus is constructed and timed to lay the coils the length of the cop, but irregularly, building up the cop with a cross-winding of the coils, and in other instances in making narrow cops the thread is carried from end to end of the cop several times in each revolution of the cylinder, but without any uniformity in the disposition of the thread, especially at the core. All of these usual modes of building up cops result in cops in the different parts of which the thread is laid differently, which are therefore built up in an unsystematic and irregular way and open to many objections. To produce a cop open to none of the objections incident to those wound as usual, I wind the same systematically from beginning to finish, depositing each portion of thread in the position it is to occupy in the completed cop, and so that it will retain such position and lay each portion of thread in a determined relation to every other portion, whereby for the first time to produce a cop that is uniform in character throughout. I secure these results by laying the thread in crossed helices on a cylinder, to which end each portion of thread between the ends of the cop must make more than half a turn around the cylinder in such manner that when reversed and carried as a helix to the opposite end it will cross and tie down the thread of the helix first laid at one or more points. The cop is built up of helices all alike as regards their length and the number of turns on each and their intersections with reverse helices. The helices are successively reversed and those of each series laid successively parallel and side by side until the core is covered by a first layer consisting of two superposed series of helices, and thus I secure the novel result of a cop having a first or foundation layer or core of two thicknesses of threads covering completely the cop tube or cylinder the entire length of the cop, and the cop is built up by a succession of such layers, each covering the layer below the length of the cop. In using the phrase "side by side" absolute contact of the helix next laid is not necessarily meant; but it requires that after one helix is laid another shall be placed substantially parallel to it, alongside of it, and in most instances in contact; but this contact is not always essential. The means for laying the thread in helices comprise the devices which reciprocate the guide and turn the cop-holder relatively, so that the thread will be laid more than half a revolution around the cop on each traverse of the guide in one direction, and by the term "laying" is meant the definite placing in position in contradistinction to feeding the thread to the cop and allowing it to slip to the position most easily assumed. In the cop thus made, therefore, each helix extends between the two ends of the cop and has substantially the same number of turns in each layer of the winding—that is, if the thread first laid directly upon the surface of the cylinder or tube is coiled around the latter twice or makes two turns in extending from one end of the cop to the other every portion of thread extending from end to end in every layer of the cop will also make two turns or substantially two turns, exactitude in this respect being desirable, although a difference of a fraction of a turn (more or less) may be permitted, and each helix in passing from end to end of the cop crosses other helices the same number of times as every other helix. As illustrating the manner in which the thread is laid upon the tube or cylinder to form a layer and thereafter in successive layers of the cop I refer to the diagram Fig. 6, showing several helices of the thread within the limits of the length of the cop as wound on a tube X. 2 represents the first helix of the thread $x$, the end of which is secured in any suitable manner, which helix winds or turns twice in traversing the length of the cop toward one end and then twice in returning as helix 3 to the first end, and 4 and 5 represent two succeeding helices. Assuming that the cylinder is turning in the direction of the arrow, the thread $x$ in laying the helix 4 before it reaches the bend $y^2$, where the helix 2 reversed its direction and became the helix 3, will be laid upon the inside of the thread of the helix 2 and then upon reaching the bend $y^2$ will be carried over and across the thread of the helix 3 at a point beyond the bend $y^2$ in the periphery of the cop and will then be bent back with a sharp bend $y^3$, and upon the further revolution of the tube the thread will be laid as helix 5 on the left side of the thread of the helix 3 and will follow said helix throughout its convolutions to the opposite end of the cop, crossing the preceding helix and tying it down at points $t$ $t$, and beyond the bend $y$ will cross the threads of the helices 2 and 4 and then be carried back, forming a bend $y'$. This is the course of each helix of thread in each layer of the cop, so that each helix in each layer lies parallel throughout its length to the thread of a previously-laid helix, and at each end of the cop the thread is bent abruptly, forming a sharp bend or knuckle where the thread crosses over the bend of the thread of a previous helix at that end, the bend of the thread of each helix being a short distance in the periphery of the cop beyond the bend of the helix previously laid. When these operations are repeated until the tube or cylinder is completely covered, it will be found that the layer thus formed consists of two thicknesses of thread, and each other layer as the cop is built will be of like character. It will be seen that the bends or knuckles constitute the ends of the completed cop.

Whatever the general form of apparatus employed it is essential that there shall be a cop-holder, which may be any form of device to support the cop tube or cylinder, means for rotating such holder, a guide and means for reciprocating it parallel to the face of the holder, and means for securing such a relative rotation of holder and reciprocation of guide that the thread will be laid in reverse helices, crossing each other one or more times between the ends of the cop. It is further essential in order to precisely dispose the thread in the cop, as above described, to deliver the thread close to the periphery of the cop, with the eye of the guide at the point where the thread is laid upon the cop, and that devices of such a character must be used that after the thread of each helix is brought to one end of the cop there will either be delay in the action in returning the thread-guide toward the opposite end or else the revolution of the cop-holder must be continued until the thread that is being laid is carried over and across the previously-laid thread, so that in the actual operation of winding the cylinder not only completes the revolution or revolutions necessary to wind each portion of thread between the ends into a helix with the proper number of turns between the ends, but there is also an increment of motion or an additional or progressive movement, or, what is the equivalent, a delay in its movement, of an extent equal to the distance necessary to carry the thread being laid on arriving at the end of the cop to the outside of the helix previously laid, so that the successive bends of the successively-laid helices are never one above the other, but are one beyond the other in the periphery of the cop, and the bend of each helix at one end is circumferentially beyond or back of the bend of said helix at the opposite end.

In the drawings I have shown forms of apparatus which are effective in securing the above-described results.

The frame A is suitably constructed to support the operating parts, hereinafter described, among which are a tube or cylinder holder B (shown as consisting of projections 6 6 of disks 5 5, which support the tube X) and a guide 43 and means for rotating said cylinder-holder and imparting a reciprocating motion to the guide in a line parallel to the axis of the cylinder-holder and for carrying back the guide as the size of the cop increases. These parts are so constructed that a cylinder or tube X may be applied to and supported by the holder B and rotated therewith and that the yarn $x$ is supported and carried to the eye of the guide 43 at the point where the guide makes contact with the cop—that is, arranged to deliver the thread at a point close to the periphery of the cop—thus preventing play of the thread between the guide and cop and so laying it that it will remain in the position it is to occupy in the completed cop, and means are employed whereby the holder is so rotated that as the thread is brought to either end of the cop the rotation will continue at an increased speed, or such an increased or decreased movement is otherwise imparted to the holder as will insure that the helix last laid shall be completed with the bend $y$ at a point circumferentially beyond or back of that of the previous helix and in advance or back of the point from which the helix started at the opposite end, or so that if the rotation of the holder is uniform the change of direction of the thread being laid shall be delayed by the delaying of the reversing movement of the guide until said thread being laid has crossed the thread of the preceding helix. Different means may be employed for causing such a relative variation of movement as will effect the above-described result. Thus in the construction shown in Figs. 1 to 5 the holder B consists of the conical hubs 6 6, two disks 5 5, capable of being separated to receive between them the tube X, Fig. 3, into the open ends of which enter said hubs 6 upon the disks, each of which is carried to turn independently upon the end of a short shaft 7, Figs. 1 and 4, which, together with the holder, is driven at a uniform speed by means of a pinion 8 and gear-wheel 9, driven through the medium of gears 10 and 11 from the driving-shaft 12. To the shaft 7 is secured fixedly a cross-arm 13, carrying a lever 14, to the outer end of which is pivoted a spring-pawl 15, that engages teeth upon the periphery of the adjacent disk 5, so that as the shaft 7 revolves in the direction of its arrows, Fig. 5, the disk will be carried by and with said shaft. At the opposite end of the arm 13 is a rock-shaft 16[a], carrying arms 16 and 18. The arm 16 is connected by a rod 17 with the lever 14, and the arm 18 extends over a cam 19 upon a sleeve 20, turning upon the shaft 7 and driven from the shaft 12 through the medium of the gears 11, 10, 21, and 22. The shaft 7 and the sleeve 20 turn in the same direction; but the revolution of one—for instance, the sleeve 20—is retarded, so that periodically the end of the arm 18, which is pressed down by a spring 23, will escape from the projecting portion $x'$ of the cam 19, thereby rocking the shaft 16[a] and throwing the arm 16, lever 14, and pawl 15 in the direction of their arrows, Fig. 5, so that as the further revolution of the shaft 7 and cross-bar 13 is continued the arm 18 will ride up the cam gradually, drawing back the arm 16 and lever 14 and carrying the pawl 15 in the direction of the arrow $a$, Fig. 5, until the end of the arm 18 again escapes from the projection $x'$. The pawl and the holder moved thereby therefore derive motion from two sources—first, from the rotation of the shaft and the cross-arm carried by the shaft, which would give to the pawl and to the holder the same rate of rotation as the shaft, and, second, from the cam which imparts to the pawl a progressive or forward traveling movement in excess of that derived from the shaft, so that at the completion of the laying of each helix or upon each successive reversal of the movement of the guide the holder or cop will have turned not only the extent necessary to bring the point upon the cop-tube that was opposite the eye of the guide at the moment of the previous reversal back to its starting position, but will also have moved an additional extent, (corresponding to the movement imparted to the pawl by the cam,) whereby the said reversing-point on the holder will be beyond the point that was opposite the eye of the guide when the latter was previously at that end of the cop. As a result of this operation, the reversal of the movement of the guide takes place not upon the exact completion of a part of rotation or of one or more rotations of the holder, but only after the guide reaches a point at one end of the cop circumferentially beyond that position which is occupied at the time the guide was reversed upon completing the helix previously laid and circumferentially at each end beyond the point where the helix started at the opposite end, so that the thread laid by the guide on its return winding will at at some point or points be laid across that of the previous coil. While it will be seen that the action of the cam is gradual and moves the disk constantly during the entire revolution at a speed slightly in excess of that derived from the shaft 7, this action might be momentary by substituting a radial pin for the cam, which pin would lift and drop the arm 18 in a fraction of a revolution.

It will be evident that that part of a rotary movement imparted to the periphery of the cop by the reciprocation of the pawl, as above described, will be less when the cop is an inch in diameter than when the cop is four inches in diameter, and, as a result, if the movement when the cop is small in diameter is only sufficient to carry the thread across that of the previously-laid helix the movement when the cop is four inches in diameter would, if all the conditions were the same, be excessive. It is a fact, however, that when the cop is small in diameter the threads are laid upon the same and cross the previously-laid portions at a more acute angle to the axis than the angle at which they are laid and cross upon the larger surface of the cop as it increases, and consequently a greater length of thread is required to cross the thread previously laid at the periphery of the full-sized cop than is required to cross the thread laid upon the layers nearer the center or core of the cop. I have found in practice that this change in the angles of the thread laid upon the successive layers in forming the cop is such as will practically coincide with the increased throw or movement of the surface of the cop as the latter increases in diameter, so that practically it is not necessary to make use of any appliances for compensating for this difference in conditions, but that on the contrary said difference avoids the necessity of making special provision for a greater travel in consequence of the greater distance across the threads, as their angle to the axis increases with the increased diameter of the cop. As the cop is clamped between the two parts 6 6, constituting the holder, in the construction of Figs. 1 to 5, the above-described movements might be imparted to one of them only; but in order to secure certainty of operation I prefer to drive each of the supporting-disks through the medium of the appliances described, and also to so set the parts that both pawls shall not change their movements at the same instant.

To hold stiff threads in position upon the cop being laid thereon, I make use of a presser-roller 4ª, carried by a frame F, consisting of a yoke-piece 25 and two parallel bars 26 26, sliding in a yoke 27, extending from and constituting part of the main frame A, the frame F, with its roller, being carried inward by means of a spring 29, connected with a lever 30 and holding the latter against a pin 37, extending from one of the bars 26. The guide 43 bears on the periphery of the cop and as the cop increases in diameter the roller and the frame are forced outward. The said spring presser-roller, however, may be supported with a yielding pressure against the cop in any other suitable manner. The guide 43 is supported and reciprocated and maintained in its relation to the periphery of the cop as the latter increases in diameter by means of any suitable appliances. As shown, the said guide is supported by a carrier G, a cross-bar 31 of which slides in bearings upon the opposite side frames, while a projection at the forward end of the carrier slides in a transverse slot in a cross-bar 32. The carrier is provided with bearings for two slide-rods 33 33, upon which is a cross-piece 34, supporting the guide, and a hook 35 at the back of the cross-piece 34 extends back of a cross-bar 36 upon the frame F, so that as the frame F is pushed back by the increasing diameter of the cop the guide is carried outward to the same extent without interfering with the free travel of the guide back and forth across the face of the cop as the reciprocating motion is imparted to the carrier.

One means of imparting the reciprocating movement to the carrier is a cam-cylinder 52, secured to the shaft 12 and having a cam-slot 38, receiving a stud 39, projecting from the carrier.

In order to permit the tubes X to be inserted in the holder and the cops to be withdrawn, I so mount the shafts 7 that they can slide longitudinally in their bearings, the gear-wheels being of sufficient width to permit this movement without disengagement, and I provide means whereby the parts of the holder may be separated to receive the tube or to allow the cop to be withdrawn and brought together to clasp the tube. Different means may be employed for sliding each of said shafts. As shown, a bell-crank lever 40, pivoted to the frame of the machine, has at one end a stud 41, extending into a groove 42 in the hub of one of the wheels upon the shaft at one side of the machine, while a similar bell-crank lever is similarly arranged on the other side of the machine and the horizontal arms of both levers extend into slots in a push-bar 43, sliding in a cross-piece of the frame and bearing upon a spring 44, which tends to lift the push-bar and throw in the shafts and bring the disks to bear upon the tube. By pushing down the bar the spring is compressed and both shafts are thrown outward. If desired, however, one of the shafts can revolve in its bearings without sliding, the movement of the other in many cases being sufficient to permit the tube to be inserted and the cop withdrawn. The thread is conducted to the guide through a suitable tension device H and around a guide-pulley 50. As before set forth, the action is the same whether the rotating cop gains sufficient at each revolution to carry the thread being laid across that previously laid at the end of the cop or the cop rotates uniformly without gain and the guide as it reaches each end of the cop is held for a longer time than is necessary for the cop to complete its rotation.

While I have referred to the movement of the holder and guide as one in which the reversing-point of each helix in effect advances beyond a point where reversal would occur if there were no such progressive movement, substantially the like result would be obtained if the progression was backward—that is, if the holder as the guide completed its traverse turned one or more times, minus the extent necessary to reverse each helix back of the reversing-point of the helix previously laid—instead of in advance of the said point.

I do not here claim the process of winding described nor the article produced, the same being the subject of applications for Letters Patent, original Serial Nos. 415,648 and 416,848.

What I claim is—

1. The combination in a winding-machine, of a rotating support for a cop tube or cylinder, a guide having an eye for the thread, means for reciprocating said guide and for turning said holder to definitely place the thread in reversed intersecting helices each in the position it is to occupy in the finished cop, and with abrupt bends at each point of reversal of the thread, means for maintaining the guide in contact with the cop with its eye at the bearing-point of the guide upon the cop, and means for progressively changing the relation of the said holder and the guide to secure the systematic laying of said helices in regular and uniform succession on the cop, and the reversal of each helix at a point at one end circumferentially different from the starting or reversing point of said helix at the opposite end, substantially as set forth.

2. In a cop-winding machine the combination of a holder, a thread-guide with its eye arranged at the point where the guide bears on the cop, to lay the thread definitely in the position it is to occupy in the finished cop, means for reciprocating the guide and rotating the holder to turn the latter more than one-half a rotation during each traverse of the guide and to reverse the latter at a point at each end and immediately beyond the point where it was previously reversed at that end, to lay each helix close and parallel to that previously laid, substantially as set forth.

3. A machine for winding cops, provided with a holder for the cop, and a reciprocating guide for the thread supported to move in constant contact with and parallel to the axis of, the cop, and outward as the cop increases in diameter, with its eye at the point where it bears on the cop, to lay the thread definitely in the position it is to occupy in the finished cop, and means for turning the holder and for reciprocating the guide, to lay the thread in reversed helices crossing each other, and mechanism for varying the relative movements of the holder and guide, to insure a regular increment of movement to the holder, whereby each reversal of the movement of the guide at each end takes place immediately after the holder has turned beyond the point circumferentially occupied by the guide at the moment of the preceding reversal of the movement of the guide at said end, substantially as set forth.

4. The combination of the cop-holder, a rotating shaft for driving the holder, a cam operating independently of said shaft, and devices between the cam and the holder to rotate the latter independently of the shaft, substantially as set forth.

5. The combination of the holder consisting of disks carried by rotating shafts, pawls for engaging teeth upon said disks, cams, and means for moving the same independently of the disks, and devices between each cam and each pawl, whereby the latter is moved by the cam to impart additional movement to the adjoining disk independently of the movement of the shaft, substantially as described.

In testimony whereof I have signed my name in the presence of two subscribing witnesses.

SIMON W. WARDWELL, JR.

Witnesses:

THOMAS M. CHILDS,

EDWIN C. SMITH.